US011421859B2

(12) United States Patent
Teichman

(10) Patent No.: US 11,421,859 B2
(45) Date of Patent: Aug. 23, 2022

(54) DIFFUSED LIGHT FOCUSING METHOD FOR USE IN FILM, TELEVISION, AND PHOTOGRAPHIC MEDIA

(71) Applicant: CINEMA DEVICES, INC., San Fernando, CA (US)

(72) Inventor: Adam Teichman, Los Angeles, CA (US)

(73) Assignee: CINEMA DEVICES, INC., San Fernando, CA (US)

( * ) Notice: Subject to any disclaimer, the term of this patent is extended or adjusted under 35 U.S.C. 154(b) by 0 days.

(21) Appl. No.: 16/923,454

(22) Filed: Jul. 8, 2020

(65) Prior Publication Data

US 2022/0010945 A1 Jan. 13, 2022

(51) Int. Cl.
*F21V 14/06* (2006.01)
*F21V 5/04* (2006.01)
*F21V 5/00* (2018.01)
*F21W 131/406* (2006.01)
*F21Y 115/10* (2016.01)

(52) U.S. Cl.
CPC ............. *F21V 14/06* (2013.01); *F21V 5/008* (2013.01); *F21V 5/045* (2013.01); *F21W 2131/406* (2013.01); *F21Y 2115/10* (2016.08)

(58) Field of Classification Search
CPC ... F21W 2131/406; F21V 14/06; F21V 5/008; F21V 5/045
See application file for complete search history.

(56) References Cited

U.S. PATENT DOCUMENTS

| 5,311,409 | A | * | 5/1994 | King | G03B 15/06 362/17 |
| 6,092,914 | A | * | 7/2000 | Esakoff | F21V 5/008 362/268 |
| 9,103,533 | B1 | * | 8/2015 | Shah | F21S 8/043 |
| 9,605,813 | B2 | * | 3/2017 | Collias | F21V 17/007 |
| 10,156,342 | B2 | * | 12/2018 | Haskal | F21V 3/049 |
| 10,801,703 | B2 | * | 10/2020 | Melzner | F21V 17/02 |
| 2020/0103097 | A1 | * | 4/2020 | Kinzer | F21V 7/0008 |

* cited by examiner

*Primary Examiner* — Arman B Fallahkhair
(74) *Attorney, Agent, or Firm* — R. Neilsudol; Henry D. Coleman

(57) ABSTRACT

A lighting assembly includes a Fresnel lens disposed at a controllable or predeterminable distance from a diffuse light source. Relatively small cutter cards are disposable between the diffuse light source and the Fresnel lens for generating various shadow effects on a photography, television or film production set. The light assembly enables a soft lighting of foreground subjects, typically actors, with a light intensity that stays relatively constant regardless of the distance of the subjects from the composite light source, specifically the Fresnel lens.

12 Claims, 8 Drawing Sheets

DIFFUSED LIGHT FOCUSING METHOD FOR USE IN FILM, TELEVISION, AND PHOTOGRAPHIC MEDIA

BACKGROUND OF THE INVENTION

The present invention relates to lighting particularly in the film and television industries. More particularly, the present invention relates to a method and an associated assembly for illuminating subjects and sets.

In film making and television program production, cinematographers and video crews must take care to regulate the illumination falling on subjects and surrounding objects. Problems arise from the difficulty, space required, and time necessary to contain soft light sources and control where their light falls on the movie or television production set. An additional challenge with broad sources such as soft lights is the shaping of light to create desired shadow patterns. Soft or diffuse lights are often favored because they produce pleasing modeling effects on objects and people's faces. Such lights can also cast natural looking shadows on surfaces and walls.

Soft shadows are achieved when the subject's angle of acceptance to the source is sufficiently large. In general, the size of the angle of acceptance varies in direct proportion to the size or area of the light source and in inverse proportion to the distance between the source and the subject. A diffuse or soft light source has an angle of acceptance that is large or wide relative to the angle of acceptance of a point source, which produces hard defined shadows. For instance, where the angle or acceptance for a particular subject, that is, the horizontal angle subtended at the subject by a cone of light extending to the light source, is larger than about 30° the illumination is typically soft. With a "hard" light source, the angle of acceptance may be as little as a few degrees and not much larger than ten degrees.

Hard light is easy to contain and intentionally shape to form desired shadows. The shadows must be produced by objects disposed in front of the light source. Accordingly, hard defined shadows are also cast by a subject onto the film or television set along with these shadows that contain the light.

Point sources, often referred to as spotlights or hard lights, easily create shadows close to the source by utilizing devices such as barn doors and small flags. Soft lights work by virtue of large diffuse surfaces that require shadow producing mediums to be equally large and need to be placed at a considerable distance from the source. This traditional method requires a lot of space, equipment, manpower and time.

OBJECTS OF THE INVENTION

It is an object of the invention to provide an improved lighting assembly and/or an associated method for illuminating still photography sets, movie and television production sets, whether stages or on location.

Another object of the present invention is to provide such an improved lighting assembly that is easier to use than conventional apparatus.

A more specific object of the present invention is to provide such an improved lighting assembly that facilitates the shaping of light patterns such as shadow effects.

A more particular object of the present invention is to provide such a lighting assembly and/or method that is adaptable for use with existing diffuse light sources.

These and other objects of the invention will be apparent from the drawings and descriptions herein. Although every object of the invention is attained in at least one embodiment of the invention, there is not necessarily any embodiment which attains all of the objects of the invention.

SUMMARY OF THE INVENTION

The present invention utilizes at least one large Fresnel optical element disposed along a light transmission path between a soft or diffuse light source and a photography, movie or television production set (either in a studio or on location). Preferably the Fresnel optical element is mechanically supported at an adjustable distance from the soft light source and/or from the set.

All of the shadows and light containment can be placed directly on the surface of the diffused light source, and in any case upstream from the Fresnel optical element along the light transmission path. This method allows the lighting crew to maintain a large source angle of acceptance on the subject (e.g., actor or actors). The Fresnel optical element magnifies the soft light of the light source, enabling the production and containment of soft shadows on the subject together with intentional shadow patterns focused only on the background surfaces.

The diffused soft light panel or source acts as the object plane and can specifically find embodiment in a flat diffuse LED panel or a diffuse panel illuminated by a point source. The pattern produced on a target in the image plane of the Fresnel optical element could be infinitely far from the element.

Conventional lighting fixtures produce shadows behind an objective lens, but these conventional lighting assemblies still constitute point sources and produce hard shadows from the subject in front of them. The present invention uniquely provides a large source that can focus light-blocking pattern masks or cutters exemplarily on the surface of a large background panel on a television or theatrical-film production set. With a large microgroove Fresnel optical element, preferably a Fresnel lens and alternatively a Fresnel reflector, the light transmitting surface of the Fresnel optical element itself constitutes a large source of illumination for a film set. (A Fresnel lens could have dual opposing concave Fresnel surfaces, with the lens functioning as a holographic lens. Generally, a holographic lens does not effectively illuminate film and television production sets owing to undesirable chromatic effects.)

A lighting assembly and associated method in accordance with the present invention maintains the size of the source. In addition, light containment and adjustment to control the shape, size, and location are sharpness of background shadows is easily accomplished by the placement of small masks or cutters between the diffuse source and the Fresnel optical element and generally on the surface of the diffuse light source.

The present invention enables one to bring the object plane into hard focus, facilitating the generation of sharp cuts, patterns and shadows on a target background surface, while the shadows cast on the background surface by a foreground subject in front (downstream) of the Fresnel optical element are soft.

Moreover, a lighting assembly in accordance with the present invention can focus hard object shadows on a background plane of a set wall while not having these shadows show up on subjects in the foreground, that is, closer to the lighting assembly. This effect is due to the shallow focus planes. The foreground subjects are still illuminated by a source the size of the front Fresnel optical element with the field of light uninterrupted by the out-of-focus shadow means, enabling fully soft illumination on foreground subjects with soft subject shadows, and hard focused shadows on the background plane.

In brief, the present invention enables the control of hard light patterns and cuts while producing pleasing soft subject shadows.

Another result and advantage of a movie and TV lighting assembly in accordance with the invention is the effective enlargement of the light source by the Fresnel optical element (whether a lens or a reflector), providing for an amplification or intensification of the illumination. By way of example, a Fresnel optical element having an area four times the area of the diffuse source, provides illumination intensified by a factor of four.

Normal methods of softening light require the placement of diffusion mediums in front of the source which while increasing the relative size of the source, which greatly reduces the light output. Similarly, bouncing the light by reflecting it off of large white objects also significantly reduces the light output.

With the key principle of this invention that utilizes clear large-sheet magnifying optics, the size of the source can be increased while the intensity is increased in an equal measure. For example if an illuminated diffuse panel is magnified four times its size relative to a target, the luminous output of the entire lighting assembly is intensified by four times. Here then there is no trading off intensity for increasing the source size.

A further advantage provided by the present invention manifests as the subject moves to positions at different distances from the Fresnel optical element. The source maintains the same relative size and intensity. Where subjects are located very close to the front optical element relative to the focal length, a lighting assembly and method pursuant to the present invention counteracts the inverse square law of light, whereby the intensity of illumination falls off as the square of distance from the source, as well as tracks the relative size or angle of acceptance to the target area as the distance is increased and decreased, maintaining both even intensity as well as shadow softness.

A lighting method in accordance with the present invention utilizes a Fresnel optical element and a diffuse light source, the diffuse light source having a substantial width and a substantial length both extending at least partially transversely to a direction of light propagation from the diffuse light source. The method includes disposing the diffuse light source and the Fresnel optical element at a first distance from one another and disposing the Fresnel optical element at a second distance from a subject. The Fresnel optical element is disposed between the diffuse light source and the subject, along a light transmission path between the diffuse light source and the subject. The method further includes illuminating the subject with light from the diffuse light source transmitted either in refraction or reflection by the Fresnel optical element so that the subject is softly lit. Where the lighting method is used on a movie or television film set, either a constructed set or on location, one records (filming and storing) an image of the subject during illuminating thereof by the diffuse light source and the Fresnel optical element. It is to be noted that the lighting assembly can be used in other circumstances, without image recording, such as in theatrical productions and live video transmissions. The lightning assembly can also find utility in the medical field, and especially in operating rooms, with or without image recording.

Preferably the Fresnel optical element is a convergent lens with concentric annular light-refracting areas. With a Fresnel lens, chromatic effects can crop up, which the present invention can address as discussed below. With a Fresnel reflector, chromatic effects do not arise. However, the concentric annular light reflecting areas of such an optical element require asymmetric geometries owing to an angle between the diffuse light source and the Fresnel reflector. In any event, the invention operates preferably with transmissive refractive optics and alternatively with opaque reflective optics bouncing the light.

In accordance with another feature of the present invention, the method further includes positioning a background panel or surface on a side of the subject at least partially opposite the Fresnel optical element. At least one shadow may be cast on the background panel or surface. In one embodiment of the invention, the shadow is generated by inserting a cutter or shadow card between the diffuse light source and the Fresnel optical element. The shadow is cast on the background panel or surface by the cutter or shadow card. The cutter or shadow card is typically positioned substantially closer to the diffuse light source than to the Fresnel optical element, for instance, nearly in contact, or nearly in contact, with the light source.

Pursuant to well known principles of optics, the size of the shadow cast on the background in the present method is determined mainly by the location of the cutter(s) relative to the focal plane of the Fresnel optical element on the same side of that element as the light source. To generate larger shadows, the cutter and the light source are positioned closer to the focal plane, on a side of the focal plane opposite the Fresnel optical element. Also the sharpness of a shadow cast by a cutter may be modulated by adjusting the distance between the cutter and the diffuse light source. The greater that distance, the less distinct the shadow's edges. The angular location of a shadow relative to a subject depends on the angular location of the respective cutter relative to the optical axis of the assembly, as defined by an imaginary line extending from a geometric center of the diffuse light source to a geometric center of the Fresnel optical element. Finally where the subject is located at or near the optical axis of a downstream portion of the lighting system (downstream of the one or more Fresnel optical elements), a shadow may be cast on the subject by locating the respective cutter along the optical axis of an upstream portion of the lighting system (between the diffuse light source and the one or more Fresnel optical elements).

Pursuant to the present invention, cutters or shadow cards deployed to generate shadow effects are much smaller than shadow cards used in conventional set lightning. Conventional cutters are large, comparable in size to the shadows generated, and placed closer to the target surface, such as a wall behind the subject(s) (typically human beings).

In accordance with a further feature of the present invention, a cutter or shadow card is provided with one or more colored or tinted edges with a color or tint preselected to reduce chromatic aberration in the image at a periphery of the shadow as cast on the set. This feature applies only where a Fresnel lens is part of a lighting assembly pursuant to the invention, to correct chromatic aberration effects.

A cutter or shadow card used in the present method need not extend over an area larger than the diffuse light source, or more accurately, the effective light emitting area of the diffuse light source (typically no more than a few feet across). A light source may have a frame or rim and other parts that do not emit radiation.

The one or more Fresnel optical elements are each preferably and advantageously much larger than the light source. Where the diffuse light source has an effective lighting emitting area and the one or more Fresnel optical elements have an effective light transmitting area, the effective light transmitting area is preferably at least twice as great as the effective light emitting area. (The term "transmitting" or "transmission" is used herein to denote transmission both by refractive optics, that is, a lens, and by reflective optics, that is a mirrored surface.)

A lighting method in accordance with the present invention may further comprise adjusting the first distance, between the one or more Fresnel optical elements and the diffuse light source, by moving a most proximal or upstream Fresnel optical element and the diffuse light source relative to one another. Where one or more cutters are used particularly to cast sharp or hard shadows on a movie or television set, a coordinated movement of the Fresnel optical element(s) and the light source is required to adjust the size(s) of the shadow(s).

It is to be noted that multiple cutters may have different shapes and be disposed at different locations relative to the diffuse light source and the Fresnel optical element, to generate a combination of hard and soft shadows on the background and/or the subject.

The method may additionally comprise replacing the light source with a different light source having a different size or dimensions and/or replacing the Fresnel optical element with a different Fresnel optical element of different dimensions.

A lighting kit in accordance with the present invention comprises a first support for holding a diffuse light source, a second support optionally connectable to the first support, and at least one Fresnel optical element disposable on the second support. This kit may be provided as a retrofit for use with existing diffuse light sources to construct a lighting assembly pursuant to the invention. The supports may be configured for alternately holding light sources and Fresnel optical elements of different sizes.

Preferably the first support and the second support are movable relative to one another so that a distance between the diffuse light source and the Fresnel optical element is adjustable. In addition, the entire assembly of supports, diffuse light source and Fresnel optical element(s) may have a collective position relative to a subject or set that may be adjusted. If the lighting assembly is light in weight and compact, relocation may simply be a matter of lifting and moving the assembly. Larger installations may be provided with preferably lockable wheels, casters, or rollers for facilitating a repositioning relative to a set.

The adjustability in the positions of the lighting assembly relative to one another and relative to a subject or set may take other forms. For instance, a Fresnel lens may be mounted to a vertical support by four telescoping poles extending to a perimeter of a lens frame. Alternatively, the source and Fresnel-element supports may be removably attachable to a superstructure, frame, or base at any of a number of different positions. The lighting assembly may comprise a superstructure, frame, or base that includes a track or rail, on the ground or floor or suspended. In that case, the supports for the lighting-assembly components are attached to the track or rail and at least one of the supports is movably attachable to the track or rail. As implied above, the Fresnel optical element may be detachably mounted to the second support.

It is to be noted that a lighting system pursuant to the invention may include more than one light transmission component, for instance, two or more Fresnel optical elements. In such a system, it is preferable to have the multiple optical transmission elements movable independently of one another on respective mounting frames (supports), as well as independently of the diffuse light source. This enables one to change image size and make the beam spread alternately smaller and larger by altering an aggregate focal length of the system.

Pursuant to another feature of the present invention, a lighting assembly may include a light shield or shroud disposable between the supports, that is, between the diffuse light source and the Fresnel optical element(s) to contain extraneous light, that is, to prevent radiation spilling from the source from spilling outside the optical path onto the set. The light shield or shroud may take any form such as a truncated pyramid and may be mountable, together with the two supports, directly or indirectly to a superstructure, frame, or base.

Pursuant to further feature of the present invention, the light shield or shroud may include a bellows made of opaque material and disposable between the diffuse light source and the Fresnel optical element(s). Thus, the light shield or shroud can accommodate changes in the first distance, that is, the distance between the diffuse light source (on a first support) and the Fresnel optical element (on a second support). The bellows may be connected to one or both supports.

Pursuant to an additional feature of the present invention, the lighting kit or assembly may include at least one motor or drive operatively connected to one of the first and the second support for shifting the light source and the Fresnel optical element alternately towards and away from one another (and relative to a movie or television filming set).

The lighting assembly may constitute a complete system, rather than a retrofit assembly, in that case further comprising a diffuse light source mountable to the first support.

The diffuse light source may be an LED array or a hard or point source together with a diffuser. In the latter embodiment, the diffuser exemplarily takes the form of (i) a sheet of paper, (ii) a white polymer film, or (iii) an angled reflector. In the former embodiment, the LED array is typically activated by an electronic control unit such as a microprocessor or a hard-wired memory and interface. The microprocessor control unit may be pre-programmed or programmable.

The electronic controller is operatively connected to the array of light emitting diodes and configured to energize the light emitting diodes in a predetermined pattern of light emission, thereby enabling generation of shadows of predetermined shapes on a background panel or wall on a side of a subject opposite the second support and the Fresnel optical element.

In accordance with a supplemental feature of the present invention, the lighting assembly includes an additional support or optical-element holder disposable in a linear array together with the first support and the second support. An additional optical element is mountable to the additional support. The additional optical element may be a lenticular lens or an achromatic laminate lens of positive and negative lens components.

Where the diffuse light source is an LED array, the light emitting diodes thereof may include diodes adapted to emit light of predetermined wavelengths selected to at least reduce chromatic effects owing to illumination from the lighting assembly.

An illumination apparatus pursuant to the present invention enables one to increase the intensity of light from a given diffuse source as illuminating a film or TV production set, as well as increasing the effective area of the source.

DETAILED DESCRIPTION

Figure 1:
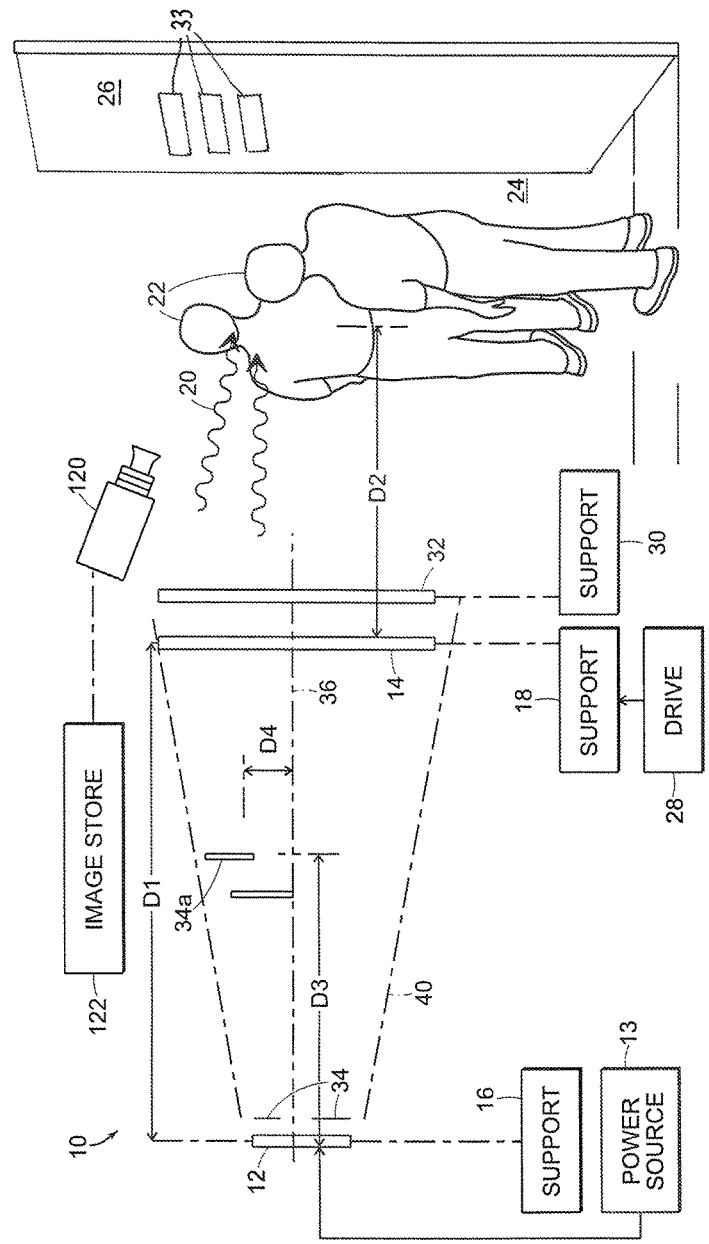
FIG. 1 is a diagram, in side elevation, of a lighting assembly pursuant to the present invention.

As shown in FIG. 1, a lighting or illumination assembly 10 particularly useful in television and theatrical film production comprises a diffuse light source 12 (connected to a power source or supply 13), a Fresnel lens 14, and one or more supports 16, 18 for holding the diffuse light source and the Fresnel lens at a predetermined distance D1 from one another in order to provide illumination 20 of a desired type to one or more subjects 22, generally people. The subjects 22 typically stand or sit on a television or film set 24 normally including one or more background objects 26 such as wall panels.

Diffuse light source 12 has, as is typical in the television and film industry, a substantial width and a substantial length both extending perpendicularly to a direction of light propagation 27 from the diffuse light source to Fresnel lens 14. Fresnel lens 14 has a square perimeter with an edge on the order of one and a half to three times the length or width of diffuse light source 12. Accordingly, the light transmitting area of Fresnel lens 14 is typically two to eight times the light emitting area of diffuse light source 12.

Supports 16 and 18 may comprise stands, frameworks or trusses, posts, pedestals, arms, suspension cables, etc. Typically, diffuse light source 12 and Fresnel lens 14 are removably mounted to respective supports 16 and 18. Supports 16 and 18 may include seats (not shown in FIG. 1) for receiving diffuse light source 12 and Fresnel lens 14, as well as various elements of adjustable length (not shown) to enable a repositioning of the diffuse light source and the Fresnel lens at a variable distance D1 from one another pursuant to the exigencies of a scene and its attendant lighting requirements.

The repositioning of diffuse light source 12 and Fresnel lens 14 relative to one another may be facilitated by a drive mechanism 28 operatively connected to one or both supports 16, 18. Drive mechanism 28 can take any suitable form including, but not limited to, rack and pinion, pulleys, or pivotable linkages movable by electric motors, hydraulic actuators, pneumatic cylinders, solenoids, etc. Support 16 and/or 18 may include, or be mounted on, rollers or casters (preferably lockable) or on a track or rail to facilitate relative repositioning of diffuse light source 12 and Fresnel lens 14. Supports 16 and 18 may moved jointly to maintain distance D1 while adjusting the distance D2 between Fresnel lens 14 and subject(s) 22. To that end, supports 16 and 18 may be mounted to a common carriage (not illustrated).

Supports 16, 18 and Fresnel lens 14, optionally with one or more drive mechanisms 28, may be distributed commercially as retrofit kits for use with one or more existing diffuse light sources 12. In this regard, it is to be further noted that supports 16, 18 are preferably configured to accommodate diffuse light sources 12 and Fresnel lenses 14 of different areas and linear dimensions.

As depicted in FIG. 1, lighting assembly 10 optionally includes a further support 30 for an additional Fresnel lens 32. Additional support or lens holder 30 is disposable in a linear array together with supports 16 and 18. While Fresnel lens 14 is preferably a convergent lens with concentric annular light-refracting areas, additional lens 32 may take the form of a lenticular lens or an achromatic laminate lens of positive and negative lens components. Additional support or lens holder 30 may be movable relative to support 18 to vary the distance between lenses 14 and 32. In that case, particularly where lens 32 constitutes another convergent lens, the adjustability in the positions of the two lenses 14 and 32 may enable a zoom functionality in changing a composite focal length of the lens system.

To illuminate a television or film production set using lighting assembly 10, one disposes diffuse light source 12 and Fresnel lens 14 at distance D1 from one another and disposes the Fresnel lens at a second distance D2 from subject 22. Fresnel lens 14 is located between diffuse light source 12 and subject 22. The method further includes illuminating the subject with light from diffuse light source 12 passing through Fresnel lens 14 so that the subject 22 is softly lit. A cinematographer (not shown) operates a camera 120 to record on film or electronic storage media 122 an image of the subject 22 as illuminated by diffuse light source 12 and Fresnel lens 14. As indicated above, Fresnel lens 14 in most cases constitutes a convergent lens with concentric annular light-refracting areas.

The film or television production method utilizing lighting assembly 10 generally further includes positioning background panel or surface 26 on a side of subject 22 opposite diffuse light source 12 and Fresnel lens 14. The filmed image may include at least one shadow 33 on background panel or surface 26.

In an exemplary, simplified version of lighting assembly 10, the background shadow 33 is generated by inserting one or more cutter or shadow cards 34 between diffuse light source 12 and Fresnel lens 14 prior to the recording of the image. The shadow 33 is cast on background panel or surface 26 by cutter or shadow card 34. To generate sharp shadows, for instance, of window blinds on a sunny day, cutter or shadow cards 34 are positioned close to diffuse light source 12, such as immediately adjacent and even in contact with a forward-facing surface (not designated) thereof. In most cases, one would position cutter cards 34 substantially closer to source 12 than to Fresnel lens 14. However, where a vague and indistinct shadow is desirable, a cutter card 34a, may be moved closer to Fresnel lens 14.

As is well-known in the field of optics, the size of a shadow cast on background panel or surface 26 is determined mainly by the location of the respective cutter 34 relative to the focal plane of Fresnel lens 14 on the same side of the lens as diffuse light source 12. To generate larger shadows, cutters 34 and light source 12 are together positioned closer to the focal plane, on a side of the focal plane opposite lens 14. Also, as indicated above, the sharpness of a shadow cast by cutter 34*a* may be modulated by adjusting a distance D3 between the cutter and diffuse light source 12. The greater the distance D3, the less distinct the shadow's edges. The angular location of a shadow relative to a subject depends on the angular location of the respective cutter relative to an optical axis 36 of lighting assembly 10. Finally where subject 22 (film or television actor) is located at or near optical axis 36, a shadow may be cast on the subject by locating the respective cutter along the optical axis.

Figure 3:
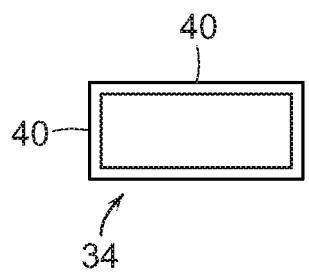
FIG. 3 is a schematic front elevational view of a cutter card for use in the lighting assembly of FIG. 1.

As represented in FIG. 3, cutter or shadow cards 34, 34*a* may be provided with one or more colored or tinted edges 40 with a color or tint preselected to reduce chromatic aberration in the image at a periphery of the shadow as cast on television or film production set 24, for instance, on background panel or surface 26.

A cutter or shadow card 34 used in the present method need not extend over an area larger than that of diffuse light source 12, or more accurately, the effective light emitting area of the diffuse light source 12 (typically no more than a few feet across). Light source 12 may have a frame or rim (not shown) and other parts that do not emit radiation.

Fresnel lens 14 is preferably and advantageously much larger than diffuse light source 12. Where diffuse light source 12 has an effective lighting emitting area and the Fresnel lens has an effective light transmitting area, the effective light transmitting area is preferably at least twice as great as the effective light emitting area.

A user may adjust distance D1, between Fresnel lens 14 and diffuse light source 12, by moving either the Fresnel lens or the diffuse light source (or both) relative to the other. Where one or more cutters 34 are used particularly to cast sharp or hard shadows on a movie or television set 24, a coordinated movement of Fresnel lens 14 and light source 12 is required to adjust sizes of cast shadows.

It is to be noted that multiple cutters 34 may have different shapes and be disposed at different locations relative to diffuse light source 12 and the Fresnel lens 14, e.g., at different distances D3 from diffuse light source 12 and at different distance D4 (FIGS. 1 and 2) from optical axis 36, to generate a desired combination of hard and soft shadows on background panels or surfaces 26 and/or subjects 22.

As discussed above, one may replace a given diffuse light source 12 with a different diffuse light source (not separately illustrated) having a different light emitting area and different linear dimensions. Alternatively or additionally, one may replace a given Fresnel lens 14 with another Fresnel lens (not separately illustrated) of different dimensions, or even a different geometry (with annular light-refracting areas, oval or elliptical light-refracting elements, or parallel light-refracting regions as in a cylindrical lens).

One skilled in the art may be inclined to devise other lighting schemes using lighting assembly 10, for instance, by including one or more point sources (not shown) in addition to diffuse light source 14, as well as by including two or more Fresnel lenses of the same or different refractive patterns.

As illustrated in FIG. 1, lighting assembly 10 preferably includes a light shield 40 disposable between first support 16 and second support 18 to block light transmission laterally of Fresnel lens 14 or transversely to optical axis 36. Light shield 40 may take the form of a truncated pyramid or a frusto-conical shade and may comprise an opaque or dark fabric or thin sheet material on a light-weight frame. Light shield 40 be mountable, together with supports 16, 18 and 30, directly or indirectly to a common superstructure, frame, or base (see FIGS. 6-8).

Figure 4:
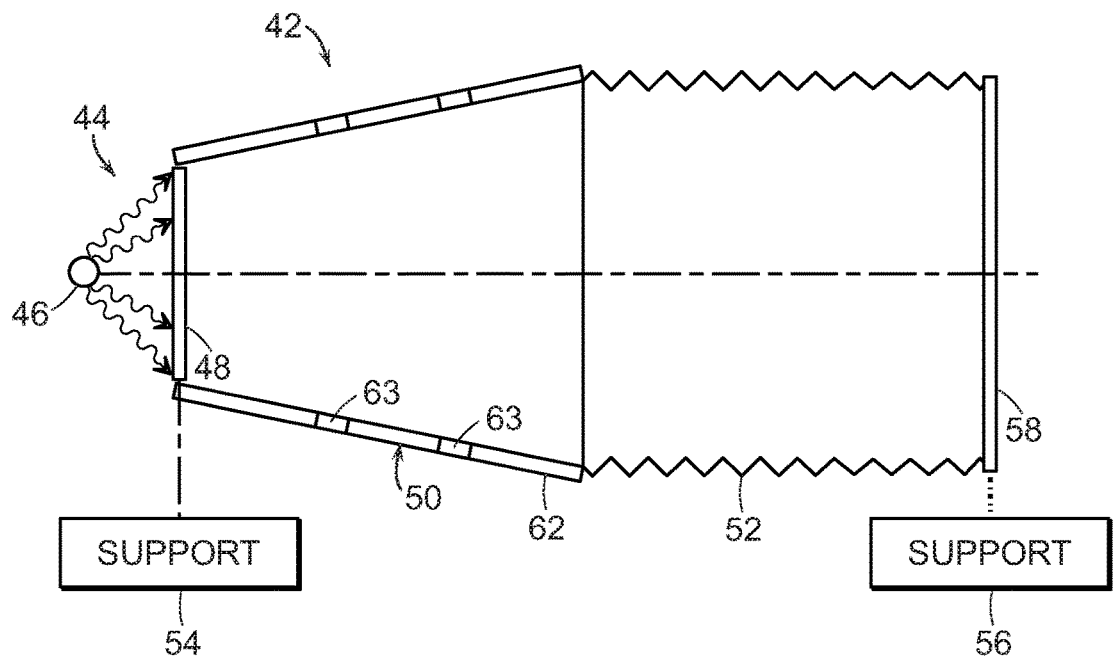
FIG. 4 is a diagram, in side elevation, of a specific embodiment of the lighting assembly of FIG. 1.

As depicted in FIG. 4, in a modified lighting assembly 42, a diffuse light source 44 includes a hard-light or point source 46 together with a diffuser 48 exemplarily (i) a sheet of paper or (ii) a white polymer film. A light shield 50 includes a bellows 52 made of opaque material and disposable between a support 54 for diffuse light source 44 and a support 56 for a Fresnel lens 58. With bellows 52 light shield 50 can accommodate changes in the distance between supports 54 and 56 and, concomitantly between diffuse light source 44 and Fresnel lens 58 mounted to bellows 52, typically at one end thereof. Light shield 50 may be connected to one or both supports 54 and 56 and optionally include an additional light shield component 62 such as a truncated pyramid enclosure optionally provided with openings 63 for facilitating the deployment of cutters.

Figure 5:
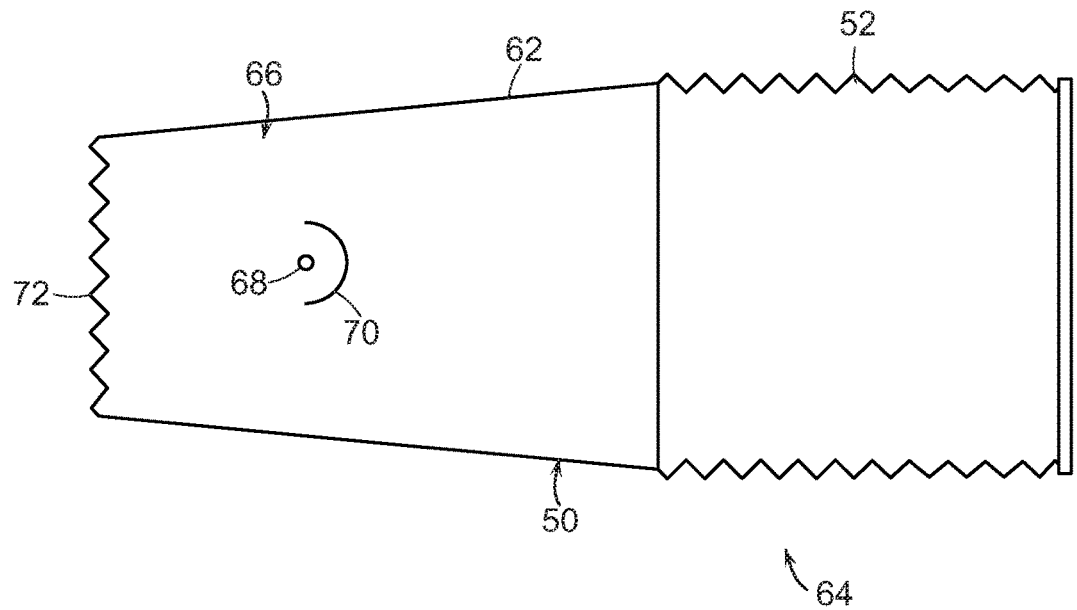
FIG. 5 is a diagram, in side elevation, of another specific embodiment of the lighting assembly of FIG. 1.

In another lighting assembly 64, shown in FIG. 5, the diffuse light source 44 of the embodiment of FIG. 4 is replaced by a diffuse light source 66 comprising a hard-light or point source 68, with a spherical mirror surface 70 reflecting light to a multifaceted reflector 72. Otherwise the lighting assembly 64 of FIG. 5 is the same as lighting assembly 42 of FIGS. 4.

Lighting assembly 10, 42, 64 may be marketed as a complete system, rather than a retrofit assembly, in that case further comprising at least one diffuse light source 12, 44, 66 mountable to support 16, 54.

Figure 2:
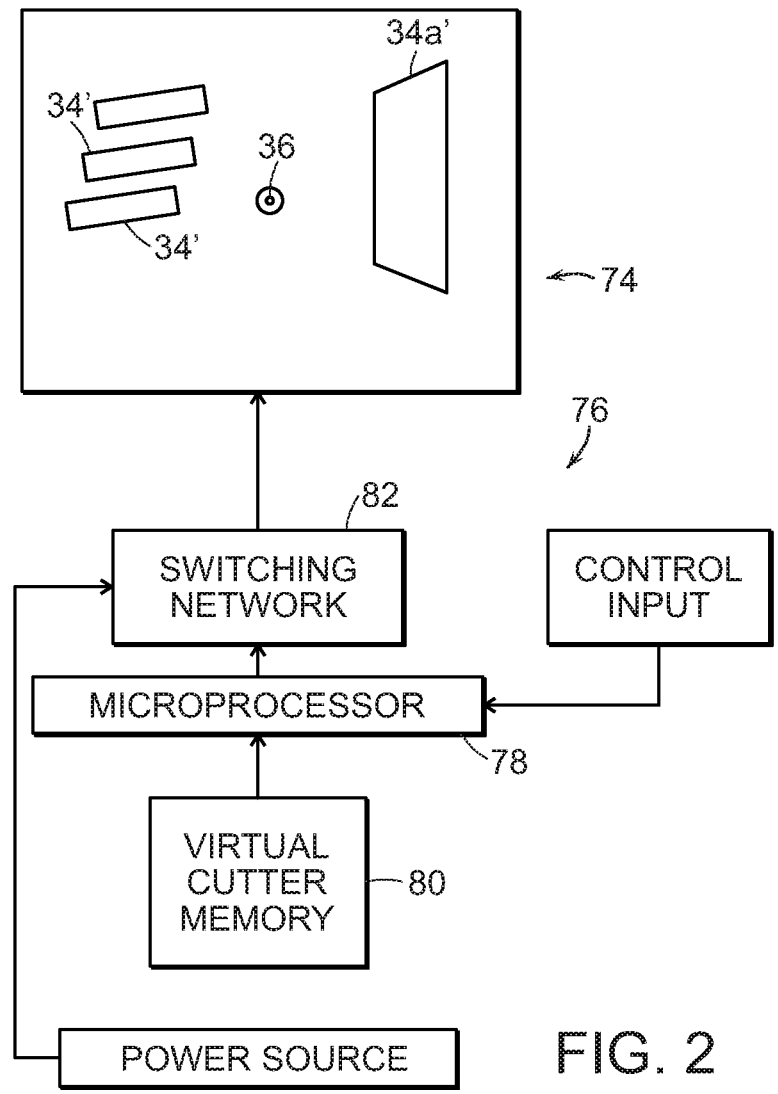
FIG. 2 is partially a schematic front elevational view of a diffuse light source utilizable in the lighting assembly of FIG. 1 and partially a block diagram of activation and control circuits for the diffuse light source.

In an alternative, more sophisticated and expensive embodiment, discussed here with reference to FIG. 2, diffuse light source 12 of FIG. 1 may take the form of an LED array 74 activated by an electronic control unit 76 including a microprocessor 78 with a control input 79, a pre-programmed ROM or hard-wired memory 80 and an interface 82 including switching circuits connected to a power source or supply 83 for selectively activating LEDS of array 74 to generate electronic or virtual cutter cards 34' electronically as areas or patterns of inactive LEDS. Indistinct or vague shadows in this case are generated by modulating the activation status of LEDS along the peripheries of electronically realized cutter cards 34*a*'. Thus, electronic control unit 76 is operatively connected to the array 74 of light emitting diodes and configured to energize the light emitting diodes in a predetermined pattern of light emission, thereby enabling generation of shadows of predetermined shapes on background panel or wall 26 on a side of subject 22 opposite support 18 and Fresnel lens 14 (FIG. 1).

Where diffuse light source 12 (FIG. 1) an LED array 74 (FIG. 2), the light emitting diodes thereof may include diodes adapted to emit light of predetermined wavelengths selected to at least reduce chromatic effects owing to illumination from the lighting assembly.

Figure 6:
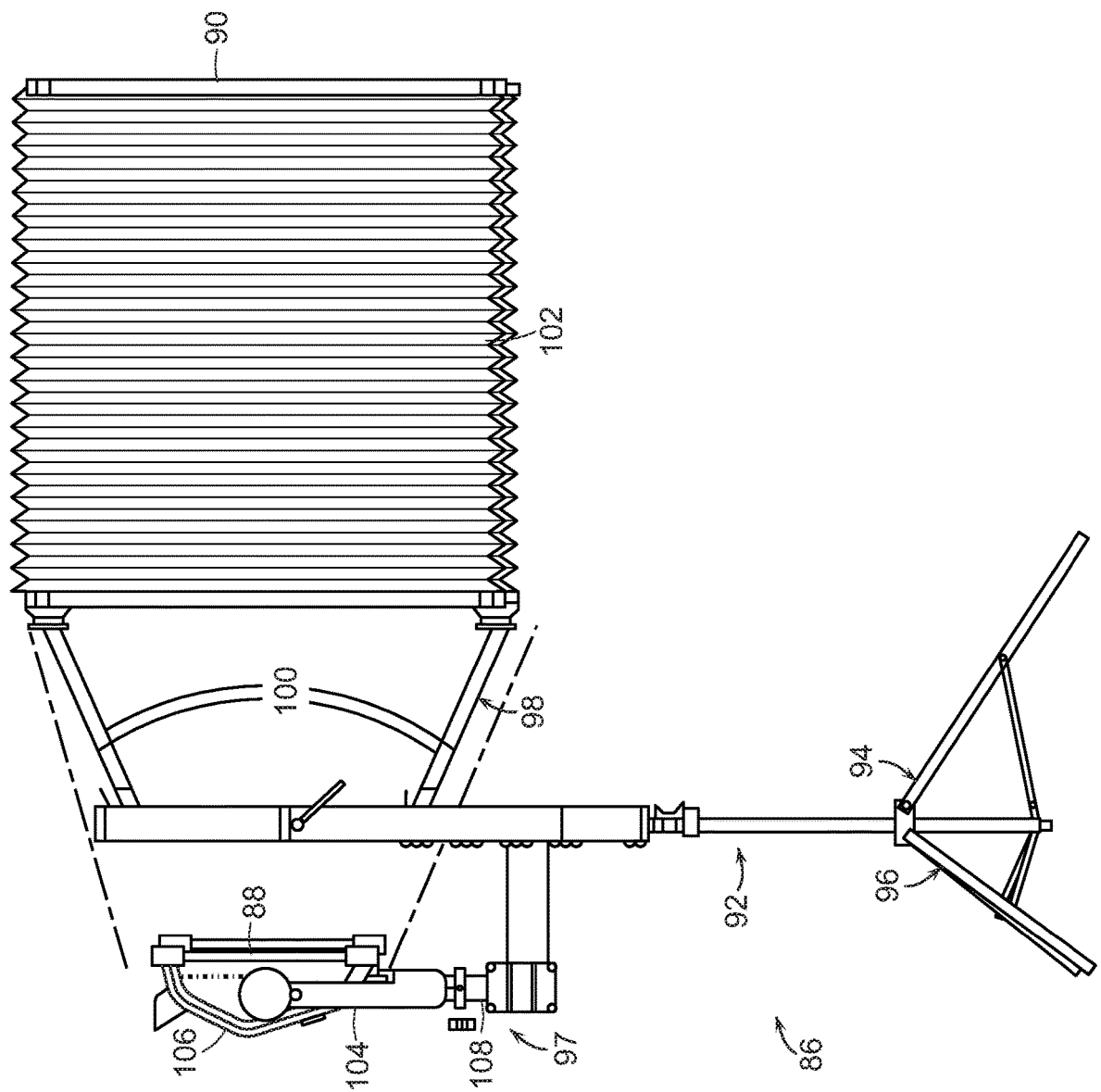
FIG. 6 is a side elevational view of a further specific embodiment of the lighting assembly of FIG. 1.
Figure 7:
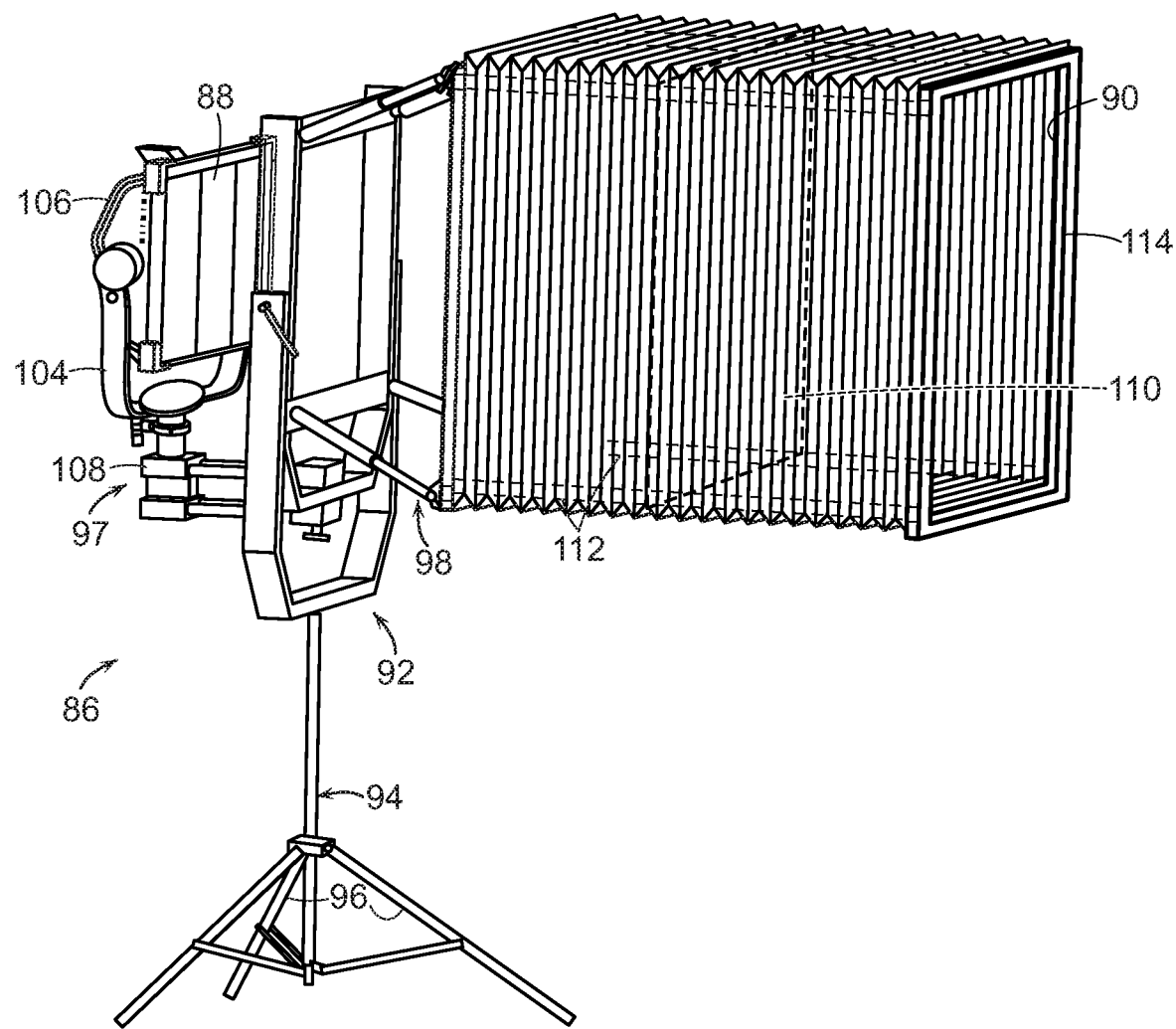
FIG. 7 is a top, front and side perspective view of the lighting assembly of FIG. 6.
Figure 8:
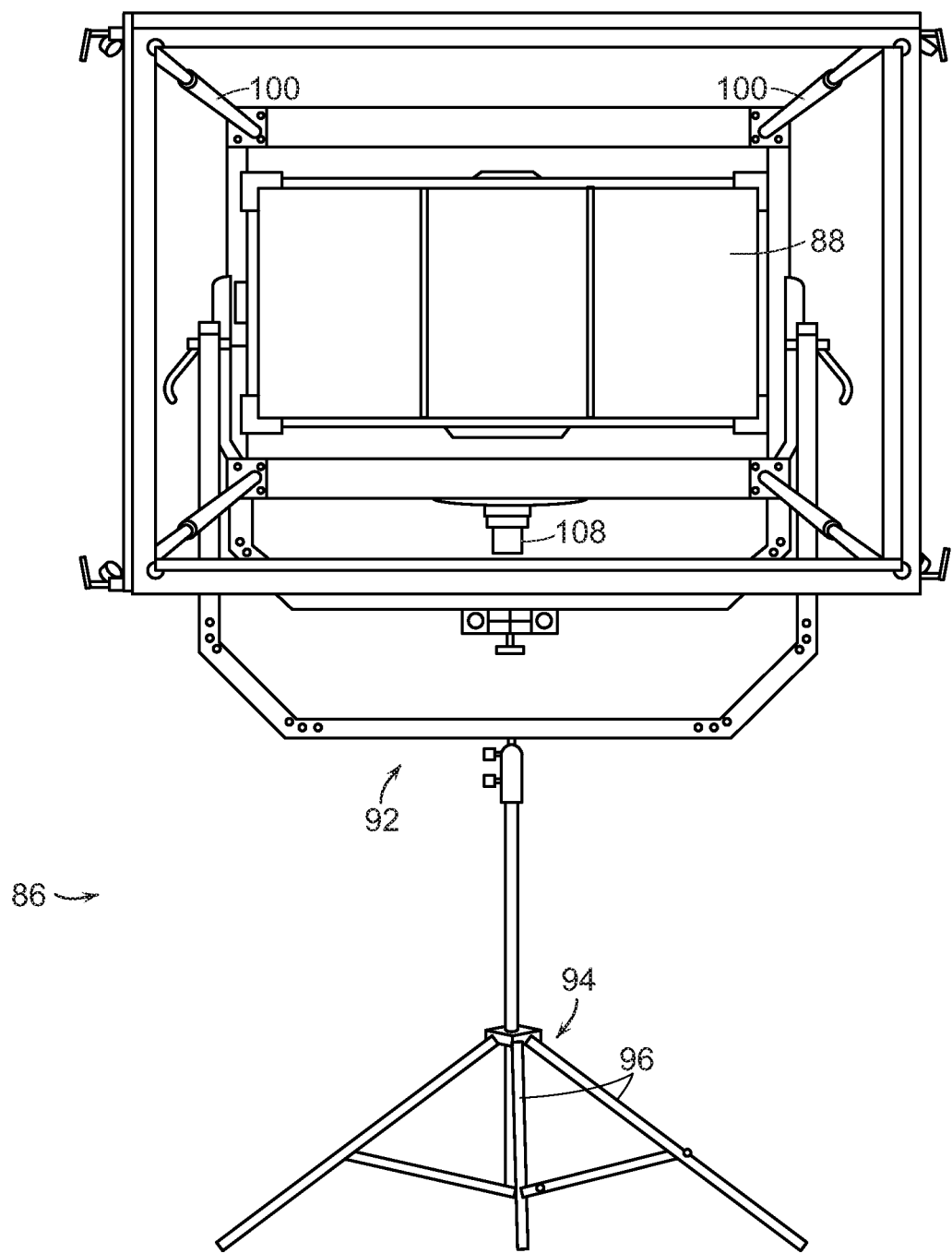
FIG. 8 is a front elevational view of the lighting assembly of FIGS. 6 and 7.

As depicted in FIGS. 6-8, a specific embodiment 86 of a lighting or illumination assembly particularly for use in television and theatrical film production comprises a diffuse light source 88 typically a relatively large element LED array, a Fresnel lens 90, and a supporting or mounting superstructure 92. Supporting superstructure 92 includes (i) a tripod base 94 having three collapsible legs 96, (ii) a support armature 97 on one side of tripod base 94 for holding diffuse light source 88, and (iii) a support frame 98 on an opposite side of tripod base 84 for Fresnel lens 90.

Support frame 98 includes four telescoping arms 100 and a bellows 102, with Fresnel lens 90 being seated at a free end of bellows 102, inside the bellows. Telescoping arms 100 enable the alternate incorporation, into lighting assembly 86, of two or more bellows 102 together with associated Fresnel lenses 90 of different sizes.

Support armature 96 includes a U-shaped yoke 104 to which diffuse light source 88 is hinged, via a pair of arcuate brackets 106 (only one visible), for pivoting about a horizontal axis. Yoke 104 is in turn rotatably mounted to a base member 108 for rotation about a vertical axis. It is to be recognized that yoke 104 and base member 108 form a universal joint coupling. These component 104 and 108 may be provided with screw type locks (not shown) for releasably fixing two angular orientations of diffuse light source 88 relative to an optical axis 108 of the lighting assembly 86.

The present invention contemplates a lighting assembly that greatly facilitates the illumination of television and film production sets, particularly enabling a soft lighting of foreground subjects at a range of distances of the lighting assembly, with substantially uniform light intensity regardless of distance of the lighting assembly from the subjects. Whereas conventional techniques for softening light on television and film production sets require the placement of diffusion mediums in front of the source, this has the result of substantially decreasing the intensity of the light illuminating the subject(s). +Generating soft lighting effects by reflecting light from large white objects also significantly reduces the illumination intensity. As actors move around on the set, the illumination impinging on them from the reflectors can change depending of the relative positions of the actors and the reflectors.

A lighting assembly as disclosed herein facilitates the generation of both sharp shadows and indistinct shadows on both background surfaces and on the subjects. The shadows can be generated by using cutter cards of much smaller size than those usual in the industry. Alternatively, the shadows can be generated electronically where the diffuse light source is an LED array. In any case the shadow generators, whether hardware or software implemented, are disposed behind the effective light source, namely, the Fresnel lens (es), and do not interfere with or limit the availability of the set for actors movements nearer the light source.

As further depicted in FIG. 7, lighting or illumination assembly 86 may include an additional Fresnel lens 110 slidably mounted inside bellows 102 to a plurality of elongate rails 112 extending in parallel to one another along corners folds of the bellows. At their distal ends, rails 112 are fixed to a frame 114 that supports Fresnel lens 90. Adjusting a longitudinal position of lens 110 along rails 112 enables a user to modify a system focal length to achieve zoom type effects. Typically, both lens 110 is a convergent Fresnel condenser lens with circular refractive zones. Secondary condenser lens 110 is used to enlarge and reduce the beam size as well as change the effective aggregate focal length. However, one or both lenses may have asymmetric refractive zones, for instance, elliptical. In addition, at least one lens 90 or 110 may be divergent.

Figure 9:
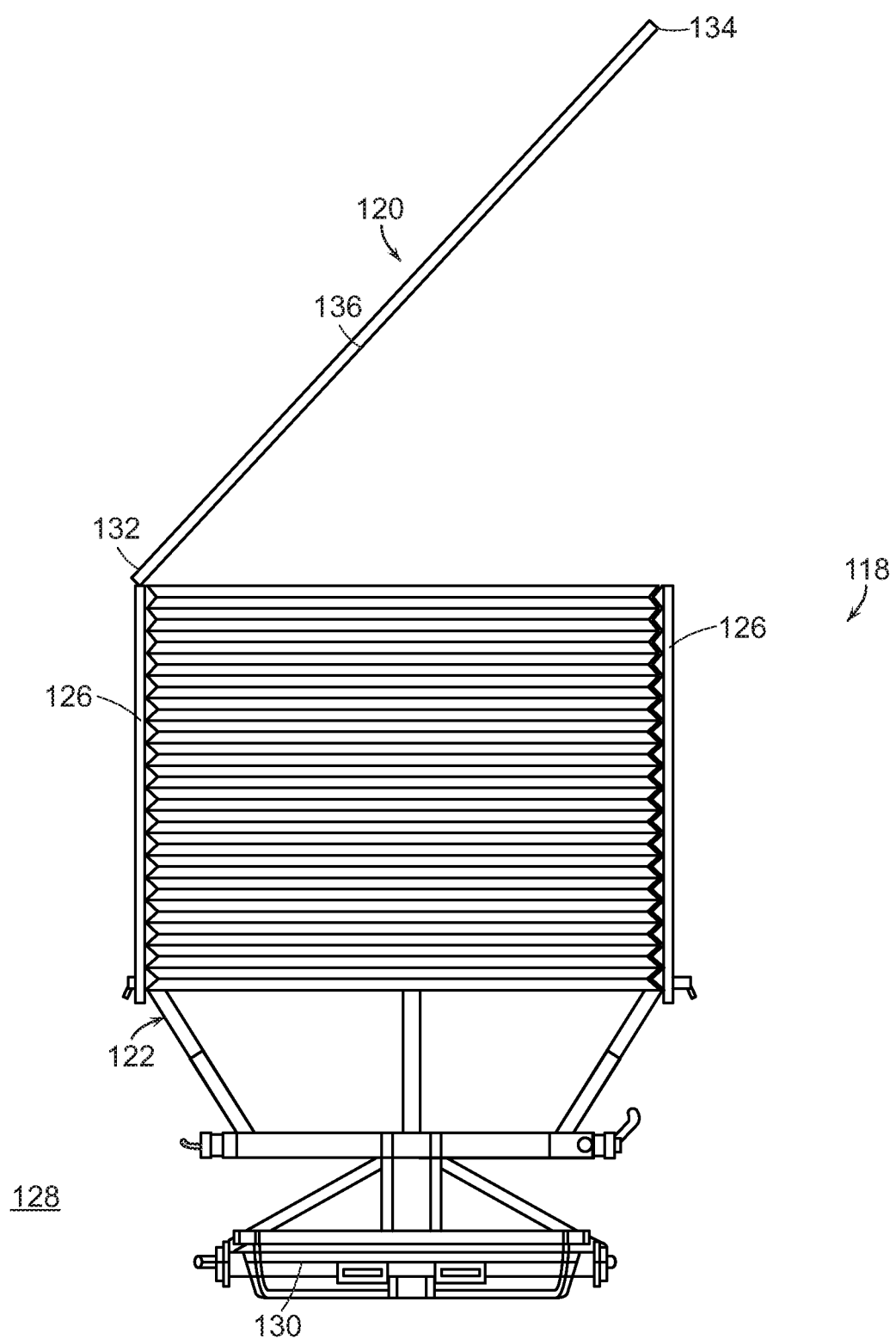
FIG. 9 is a schematic side elevational view of another lighting or illumination assembly in accordance with present invention.

As shown in FIG. 9, another lighting or illumination assembly 118 of particular utility on film and television production sets, either stage or on location, includes at least one Fresnel magnifying reflector 120, optionally with one or more other Fresnel elements (not shown) whether refractive or reflective. Fresnel reflector 120 is mounted to a supporting structure 122 and disposed above an upper end of a vertically oriented bellows 124. Supporting structure 122 may include a plurality of telescoping tubular members 126 and a base 128 to which a diffuse light source 130 is attached, below bellows 124. Light travels upwardly from diffuse source 130 to Fresnel reflector 120, and down from the reflector at an angle to the floor or ground of the production set (not shown).

Fresnel reflector 120 has the advantage of not giving rise to chromatic effects. Reflector 120 is a magnifying lens utilizing concentric angled Fresnel reflective surfaces that are asymmetrical in order to even out the magnification values for the portion of the reflector that is closer to the source from the portion that is further away, with the reflective unit being placed, for example, at a 45° angle to the source 130. The asymmetric geometries in the concentric or annular light reflecting areas of reflector 120 ensure that the various subjects and background surfaces on the production set receive the desired amount of light. More specifically, reflective surfaces along a lower edge 132 of Fresnel reflector 120 are selected to provide greater magnification, that is, to have short focal lengths, than reflective surfaces along an upper edge 134 of the reflector 120. Along side edges 136 of Fresnel reflector 120, between lower edge 132 and upper edge 134, angles of surface inclination continuously vary so that magnification gradually changes from a maximum at lower edge 132 to a minimum at upper edge 134.

In any event, the invention can operate with transmissive refractive optics or opaque reflective optics bouncing the light. All of the options discussed above with respect to shadow generation and control, light amplification, multiple optical elements, supports with position adjustment capabilities, et. apply when one or more Fresnel reflectors are included in the illumination system.

Figure 10:
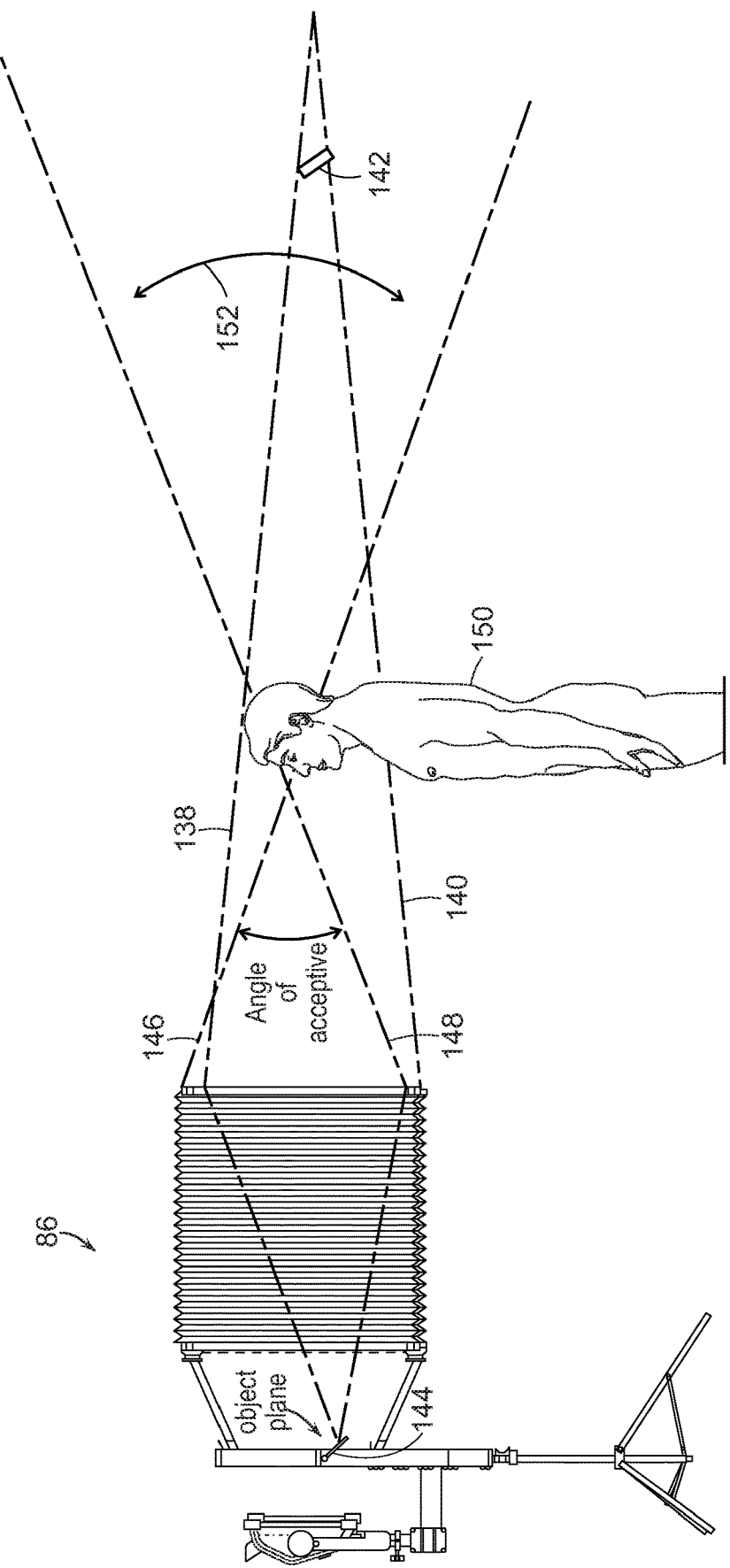
FIG. 10 is a schematic side elevational view of the lighting assembly of FIGS. 6-8, indicating with light ray paths shadow formation on a background surface with diffuse lighting of a subject in a foreground position on a film or television production set.

As depicted in FIG. 10, light rays 138, 140 producing a background shadow 142 on a film or television production set emanate from lighting or illumination assembly 86. Rays 138, 140 start from a shadow card object 144 in an object plane. Rays 146, 148 of diffuse lighting of a subject 150 in a foreground position on the film or television production set diverge from the subject and accordingly have no shadow effect on the background. FIG. 10 thus illustrates how an object 144 on the object plane can be focused (at 142) on the background of the image plane represented by rays 138, 140. Rays 146, 148 illustrate the angle of acceptance of the incident light from the magnifying diffuser assembly 86 to any given point on the subject 150, and how large, and hence soft, the subject shadow is from any given point on the subject, on the background, as indicated by a double-header arcuate arrow 152.

In contrast to the lighting assemblies described herein, a hard focusing ellipsoidal reflector spot light with standard or non-Fresnel lenses would have to be about the size of an automobile to create the soft affect on a subject achievable with the present installations.

Although the invention has been described in terms of particular embodiments and applications, one of ordinary skill in the art, in light of this teaching, can generate additional embodiments and modifications without departing from the spirit of or exceeding the scope of the claimed invention. The present disclosure sets forth exemplary simple, inexpensive and easy-to-use embodiments, for purposes of elucidating the principles and essential features of the invention. However, one skilled in the art can readily conceive alternative support and moving mechanisms. In addition, a lighting assembly pursuant to the invention may utilize various combinations of lenses and even multiple primary sources such as a diffuse source and one or more point sources of respective output intensities, the latter being disposed between the diffuse source and the first Fresnel lens. A Fresnel lens used in the present lighting assembly may have plural focal zones, with respective focal lengths.

Accordingly, it is to be understood that the drawings and descriptions herein are proffered by way of example to facilitate comprehension of the invention and should not be construed to limit the scope thereof.

What is claimed is:

1. A lighting method for the film and television production industry, comprising:
providing at least one Fresnel lens and a diffuse light source, the diffuse light source having a sufficiently substantial width and a sufficiently substantial length both extending at least partially transversely to an axis of light propagation from the diffuse light source, so as to enable diffuse or soft lighting of an actor on a photography, film or television production set;
disposing said light source and said at least one Fresnel lens at a first distance from one another on the photography, film or television production set;
disposing said at least one Fresnel lens at a second distance from the actor on the photography, film or television production set and at a third distance from a background panel or surface disposed on a side of said actor at least partially opposite the Fresnel lens;
generating patterns of different light intensity in a vicinity of an emission plane of the diffuse light source;
illuminating said actor with light transmitted from said diffuse light source to said at least one Fresnel lens and from same to said actor, said first distance and said second distance being selected so that said actor is softly lit at least in part and said third distance being selected in part so that said actor casts no sharp or hard shadows on said background panel or surface; and
simultaneously with the illuminating of said actor, casting at least one shadow on said background panel by light from said diffuse light source by virtue of the patterns of different light intensity generated in the vicinity of the emission plane of the diffuse light source, wherein said emission plane is an object plane of said Fresnel lens, while said background panel is located in an image plane of said Fresnel lens.

2. The method defined in claim 1 wherein the generating of patterns of different light intensity includes inserting a cutter or shadow card between said diffuse light source and said Fresnel lens.

3. The lighting method defined in claim 2 wherein said cutter or shadow card is positioned closer to said diffuse light source than to said Fresnel lens.

4. The lighting method defined in claim 2 wherein said cutter or shadow card is provided with one or more colored or tinted edges with a color or tint preselected to reduce chromatic aberration at a periphery of said at least one shadow.

5. The lighting method defined in claim 1 wherein said at least one Fresnel lens is a first Fresnel lens, further comprising:
providing a second Fresnel lens; and
disposing said second Fresnel lens at a fourth distance from said diffuse light source, the illuminating of said actor including directing light (i) from said diffuse light source to one of said first Fresnel lens and said second Fresnel lens, (ii) from said one of said first Fresnel lens and said second Fresnel lens to the other of said first Fresnel lens and said second Fresnel lens, and (iii) from the other of said first Fresnel lens and said second Fresnel lens to said actor so that said actor is softly lit at least in part.

6. The lighting method defined in claim 1 wherein said diffuse light source has an effective lighting emitting area and said at least one Fresnel lens has an effective light transmitting area, said effective light transmitting area being at least twice as great as said effective light emitting area.

7. The lighting method defined in claim 1, further comprising adjusting said first distance by moving at least one of said at least one Fresnel lens and said diffuse light source relative to the other.

8. The lighting method defined in claim 1, further comprising adjusting said third distance by moving both said at least one Fresnel lens and said diffuse light source relative to said background panel or surface.

9. The lighting method defined in claim 1 wherein the diffuse light source is a first light source and wherein the Fresnel lens is a first lens, further comprising replacing at least one of the first light source and the first lens with a respective one of a different diffuse light source and a different Fresnel lens, the different diffuse light source having dimensions different from those of the first light source, the different Fresnel lens having dimensions different from those of the first lens.

10. The method defined in claim 1 wherein the diffuse light source constitutes an array of discrete light generating elements and wherein the generating of patterns of different light intensity includes operating a computer to differentially energize or activate said light generating elements.

11. A lighting method for the film and television production industry, comprising: providing a plurality of optical elements including at least one microgroove Fresnel lens, a primary light source, and a planar diffuser panel; disposing said planar diffuser panel between said primary light source and said at least one microgroove Fresnel lens to define an optical transmission path; locating said primary light source, said planar diffuser panel and said at least one microgroove Fresnel lens in spaced relation to a background panel or surface and to an actor in front of the background panel on a photography, film or television production set, the locating of said primary light source, said planar diffuser panel and said at least one microgroove Fresnel lens including selecting distances among said optical elements and said background panel so that said planar diffuser panel is located in an object plane and said background panel is located in an image plane of said at least one Fresnel lens; and transmitting light from said planar diffuser panel to said actor and said background panel via said at least one microgroove Fresnel lens, the transmitting of light including (i) bringing said planar diffuser panel into hard or sharp focus on said background panel, (ii) illuminating said actor only with soft lighting, and (iii) casting only soft shadows on said background surface by said actor; and generating patterns of different light intensity in a vicinity of said planar diffuser panel, and wherein the transmitting of light further includes simultaneously with the illuminating of said actor, casting at least one shadow on said background panel by light from said planar diffuser panel by virtue of the patterns of different light intensity generated in the vicinity of said planar diffuser panel.

12. The method defined in claim 11, further comprising inserting a cutter or shadow card between said diffuse light source and said at least one microgroove Fresnel lens.

* * * * *